US012604085B2

(12) United States Patent

Takahashi et al.

(10) Patent No.: US 12,604,085 B2

(45) Date of Patent: Apr. 14, 2026

(54) IMAGING METHOD AND IMAGING APPARATUS

(71) Applicant: FUJIFILM Corporation, Tokyo (JP)

(72) Inventors: Kosuke Takahashi, Saitama (JP);
Koichi Tanaka, Saitama (JP);
Shunsuke Miyagishima, Saitama (JP);
Hiroki Saito, Saitama (JP); Tomoki Otsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 226 days.

(21) Appl. No.: 18/516,911

(22) Filed: Nov. 21, 2023

(65) Prior Publication Data

US 2024/0089588 A1     Mar. 14, 2024

Related U.S. Application Data

(63) Continuation of application No. PCT/JP2022/018701, filed on Apr. 25, 2022.

(30) Foreign Application Priority Data

Jun. 17, 2021     (JP) ................................. 2021-100823

(51) Int. Cl.
*H04N 23/63*        (2023.01)
*H04N 23/695*       (2023.01)

(52) U.S. Cl.
CPC ......... *H04N 23/634* (2023.01); *H04N 23/695* (2023.01)

(58) Field of Classification Search
CPC .. H04N 23/634; H04N 23/695; H04N 23/951; H04N 23/64; H04N 23/667; H04N 23/6812; H04N 23/685; G03B 15/00
See application file for complete search history.

(56) References Cited

U.S. PATENT DOCUMENTS 7,584,012 B2 *   9/2009  Hirai ................ G05B 19/41875
                                                700/121
11,782,232 B2   10/2023  Seo et al.
                 (Continued)

FOREIGN PATENT DOCUMENTS

JP        2003283887        10/2003
JP        2007135133        5/2007
                 (Continued)

OTHER PUBLICATIONS

"International Search Report (Form PCT/ISA/210) of PCT/JP2022/018701", mailed on Jul. 19, 2022, with English translation thereof, pp. 1-5.

(Continued)

*Primary Examiner* — Christopher K Peterson
(74) *Attorney, Agent, or Firm* — JCIPRNET

(57)                    ABSTRACT

The imaging method is used in an imaging apparatus including an imaging element that captures a subject image and a moving mechanism configured to change a relative position between the subject image and the imaging element, the imaging method including: a changing step of changing the relative position a plurality of times; an imaging step of acquiring a plurality of first images by capturing the subject image using the imaging element at a plurality of the relative positions; a combining step of generating a second image by combining the plurality of first images; and a display step of performing a temporal display relating to the imaging step or the combining step.

12 Claims, 9 Drawing Sheets

(56)     References Cited

U.S. PATENT DOCUMENTS

| | | | |
|---|---|---|---|
| 2004/0017487 A1* | 1/2004 | Ueda ..................... | H04N 23/63 |
| | | | 348/222.1 |
| 2010/0079608 A1 | 4/2010 | Wong et al. | |
| 2010/0141823 A1 | 6/2010 | Tsunekawa et al. | |
| 2012/0300095 A1 | 11/2012 | Sawada | |
| 2019/0327419 A1 | 10/2019 | Onomura | |

FOREIGN PATENT DOCUMENTS

| | | |
|---|---|---|
| JP | 2010161760 | 7/2010 |
| JP | 2012249070 | 12/2012 |
| JP | 2014123881 | 7/2014 |
| JP | 2016171511 | 9/2016 |
| JP | 2019161564 | 9/2019 |
| JP | 2019191258 | 10/2019 |
| JP | 2021503815 | 2/2021 |
| WO | 2010032649 | 3/2010 |
| WO | 2016147957 | 9/2016 |

OTHER PUBLICATIONS

"Written Opinion of the International Searching Authority (Form PCT/ISA/237) of PCT/JP2022/018701", mailed on Jul. 19, 2022, with English translation thereof, pp. 1-8.
"Notice of Reasons for Refusal of Japan Counterpart Application", issued on Sep. 24, 2025, with English translation thereof, p. 1-p. 8.

\* cited by examiner

MULTI-SHOT COMBINING MODE
IS BEING EXECUTED

IMAGING PROCESS

40%

COMBINING PROCESS

0%

15

MULTI-SHOT COMBINING MODE
IS BEING EXECUTED

IMAGING PROCESS HAS
BEEN STOPPED.

REASON: BRIGHTNESS HAS CHANGED.

IMAGING METHOD AND IMAGING APPARATUS

CROSS-REFERENCE TO RELATED APPLICATION

This application is a continuation application of International Application No. PCT/JP2022/018701, filed Apr. 25, 2022, the disclosure of which is incorporated herein by reference in its entirety. Further, this application claims priority from Japanese Patent Application No. 2021-100823 filed on Jun. 17, 2021, the disclosure of which is incorporated herein by reference in its entirety.

BACKGROUND

1. Technical Field

The technology of the present disclosure relates to an imaging method and an imaging apparatus.

2. Description of the Related Art

JP2016-171511A discloses a digital camera that generates a high-quality image by a super-resolution process. The digital camera disclosed in JP2016-171511A is a digital camera that acquires four captured images while moving a relative position of an image sensor with respect to a subject image and that performs a super-resolution process, and the digital camera detects whether or not there is a change in the subject image between a captured image obtained by performing first imaging and a captured image obtained by performing capturing of second or subsequent image, each time imaging is performed. In a case in which the change in the subject image occurs, super-resolution imaging is redone from the beginning.

JP2019-161564A discloses an image processing apparatus capable of obtaining high-quality composite image data. An acquisition unit acquires a plurality of image data having RGB color elements. A division unit divides each image data into a plurality of regions. A calculation unit calculates a shift amount for each region of each image data. A color interpolation unit performs color interpolation for at least one of RGB color elements based on the shift amount for each region of each image data.

JP2003-283887A discloses an image acquisition apparatus comprising: a pixel shifting section that moves a relative position between a luminous flux incident on an imaging element and the imaging element; an imaging section that performs imaging in a case in which the relative position is located at a specific position or in a case in which the relative position is located at at least one position moved by a series of operations from the specific position by the pixel shifting section; an image generation section that generates a new high-resolution image from a plurality of image data captured by the imaging section in the series of operations; and a display control section that displays an image captured at an early stage among a plurality of images captured before the new image is generated.

SUMMARY

One embodiment according to the technology of the present disclosure provides an imaging method and an imaging apparatus that enable a user to recognize a processing status.

In order to achieve the object, according to one aspect of the present disclosure, there is provided an imaging method used in an imaging apparatus including an imaging element that captures a subject image and a moving mechanism configured to change a relative position between the subject image and the imaging element, the imaging method comprising: a changing step of changing the relative position a plurality of times; an imaging step of acquiring a plurality of first images by capturing the subject image using the imaging element at a plurality of the relative positions; a combining step of generating a second image by combining the plurality of first images; and a display step of performing a temporal display relating to the imaging step or the combining step.

It is preferable that the temporal display is a display with which an execution time of the imaging step or the combining step is recognizable.

It is preferable that the imaging method further comprises: a determination step of determining whether or not the combining step is executable based on whether or not at least one of the plurality of first images satisfies a first condition, and that the combining step is executed in a case in which an affirmative determination is made in the determination step, and a process content of the imaging step is changed in a case in which a negative determination is made.

It is preferable that the imaging method further comprises: a first stopping step of stopping the capturing of the subject image in the imaging step in a case in which a negative determination is made in the determination step.

It is preferable that the imaging method further comprises: a second stopping step of stopping the temporal display in the display step in a case in which the capturing of the subject image is stopped.

It is preferable that the imaging method further comprises: a notification step of notifying a user of a reason for stopping the capturing of the subject image or a reason for stopping the temporal display.

It is preferable that, in the changing step, the relative position is changed by using a shake applied to the imaging apparatus.

It is preferable that, in a case in which a negative determination is made in the determination step, the number of capturing operations of the subject image in the imaging step is increased more than in a case in which an affirmative determination is made.

It is preferable that the imaging method further comprises: an update step of updating the temporal display in the display step in a case in which the number of the capturing operations of the subject image in the imaging step is increased.

It is preferable that the imaging method further comprises: a notification step of notifying a user of a reason for increasing the number of the capturing operations in the imaging step or a reason for updating the temporal display.

It is preferable that, in the changing step, the relative position is changed by moving the imaging element to a predetermined position using the moving mechanism.

According to another aspect of the present disclosure, there is provided an imaging apparatus comprising: an imaging element that captures a subject image; a moving mechanism configured to change a relative position between the subject image and the imaging element; and a processor, in which the processor is configured to execute a changing process of changing the relative position a plurality of times, an imaging process of acquiring a plurality of first images by capturing the subject image using the imaging element at a plurality of the relative positions, a combining process of generating a second image by combining the plurality of first images, and a display process of performing a temporal display relating to the imaging process or the combining process.

It is preferable that the processor is configured to selectively execute a first mode and a second mode, in the first mode, change the relative position by using a shake applied to the imaging apparatus in the changing process, in the second mode, change the relative position by moving the imaging element to a predetermined position using the moving mechanism in the changing process, execute a determination process of determining whether or not the combining process is executable based on whether or not at least one of the plurality of first images satisfies a first condition, and change the temporal display in the display process to different contents between the first mode and the second mode in a case in which a negative determination is made in the determination process.

BRIEF DESCRIPTION OF THE DRAWINGS

Exemplary embodiments according to the technique of the present disclosure will be described in detail based on the following figures, wherein:

FIG. 1 is a schematic perspective view showing an example of a front surface side of an imaging apparatus.

DETAILED DESCRIPTION

Figure 2:
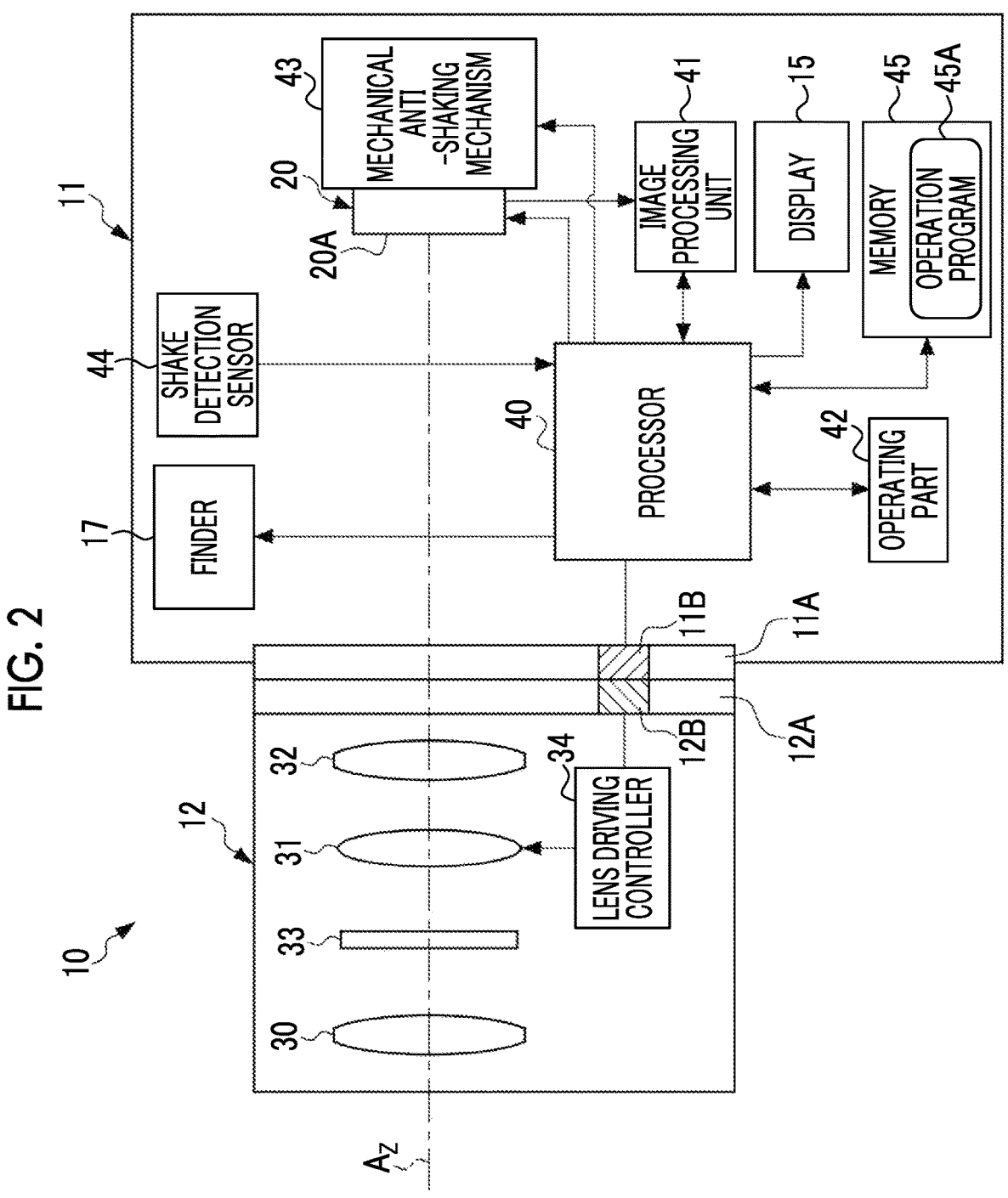
FIG. 2 is a diagram showing an example of an internal configuration of the imaging apparatus.

An example of an embodiment relating to the technology of the present disclosure will be described with reference to the accompanying drawings.

First, the terms used in the following description will be described.

In the following description, the "IC" is an abbreviation for "integrated circuit". The "CPU" is an abbreviation for "central processing unit". The "ROM" is an abbreviation for "read only memory". The "RAM" is an abbreviation for "random access memory". The "CMOS" is an abbreviation for "complementary metal oxide semiconductor".

The "FPGA" is an abbreviation for "field programmable gate array". The "PLD" is an abbreviation for "programmable logic device". The "ASIC" is an abbreviation for "application specific integrated circuit". The "OVF" is an abbreviation for "optical view finder". The "EVF" is an abbreviation for "electronic view finder". The "JPEG" is an abbreviation for "joint photographic experts group". The "DSP" is an abbreviation for "digital signal processor".

As an embodiment of an imaging apparatus, the technology of the present disclosure will be described by using a lens-interchangeable digital camera as an example. The technology of the present disclosure is not limited to the lens-interchangeable type, and can be applied to a digital camera having a lens integrated therein.

Figure 1:
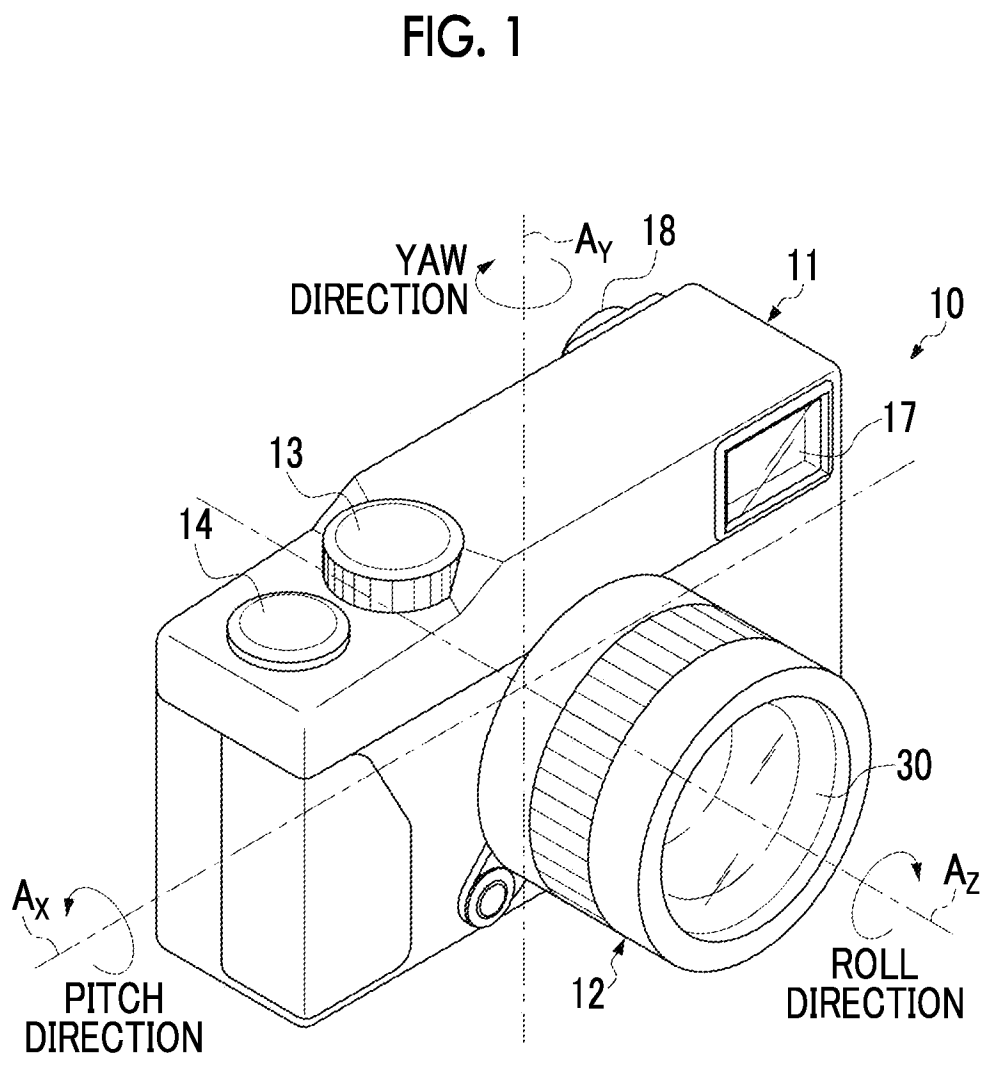

FIG. 1 shows an example of a front surface side of an imaging apparatus 10. As shown in FIG. 1, the imaging apparatus 10 is a lens-interchangeable digital camera. The imaging apparatus 10 includes a main body 11 and an imaging lens 12 which is interchangeably mounted on the main body 11. The imaging lens 12 is attached to a front surface side of the main body 11 via a camera-side mount 11A and a lens-side mount 12A (refer to FIG. 2). The imaging lens 12 is an example of a lens according to the technology of the present disclosure.

A dial 13 and a release button 14 are provided on an upper surface of the main body 11. The dial 13 is operated in a case of setting an operation mode or the like. Examples of the operation mode of the imaging apparatus 10 include a still image capturing mode, a video image capturing mode, and an image display mode. The release button 14 is operated by a user in a case of starting execution of the still image capturing or the video image capturing.

In addition, the still image capturing mode includes a "multi-shot combining mode" for obtaining a super-resolution image. The multi-shot combining mode of the present embodiment is a mode in which a plurality of images are acquired and combined by changing a relative position between a subject image and an imaging sensor 20 (refer to FIG. 2) by using a shake applied to the imaging apparatus 10 due to a camera shake of the user or the like. By combining the plurality of images with different relative positions between the subject image and the imaging sensor 20, a super-resolution image having a resolution exceeding a resolution of one image can be obtained.

The main body 11 is provided with a finder 17. Here, the finder 17 is a hybrid finder (registered trademark). The hybrid finder refers to a finder in which, for example, an optical view finder (hereinafter, referred to as "OVF") and an electronic view finder (hereinafter, referred to as "EVF") are selectively used.

A finder eyepiece portion 18 is provided on a back surface side of the main body 11. An optical image that can be visually recognized by the OVF and a live view image that is an electronic image that can be visually recognized by the EVF are selectively projected on the finder eyepiece portion 18. The user can observe an optical image or a live view image of a subject via the finder eyepiece portion 18.

In addition, a display 15 (see FIG. 2) is provided on the back surface side of the main body 11. The display 15 displays an image based on an image signal obtained by performing imaging, various menu screens, and the like.

AZ axis $A_Z$ shown in FIG. 1 corresponds to an optical axis of the imaging lens 12. An X axis $A_X$ and a Y axis $A_Y$ are orthogonal to each other and orthogonal to the Z axis $A_Z$. The X axis $A_X$ and the Y axis $A_Y$ correspond to a pitch axis and a yaw axis according to the technology of the present disclosure. In the following description, a rotation direction around the Z axis $A_Z$ is referred to as a roll direction. In addition, a rotation direction around the X axis $A_X$ is referred to as a pitch direction. In addition, a rotation direction around the Y axis $A_Y$ is referred to as a yaw direction. In addition, a direction of the X axis $A_X$ is referred to as an X direction, and a direction of the Y axis $A_Y$ is referred to as a Y direction.

FIG. 2 shows an example of an internal configuration of the imaging apparatus 10. The main body 11 and the imaging lens 12 are electrically connected to each other by bringing an electrical contact 11B provided on a camera-side mount 11A into contact with an electrical contact 12B provided on a lens-side mount 12A.

The imaging lens 12 includes an objective lens 30, a focus lens 31, a rear end lens 32, and a stop 33. The respective members are arranged in the order of the objective lens 30, the stop 33, the focus lens 31, and the rear end lens 32 from an objective side along the optical axis (that is, the Z axis $A_Z$) of the imaging lens 12. The objective lens 30, the focus lens 31, and the rear end lens 32 constitute an imaging optical system. The type, number, and arrangement order of the lenses constituting the imaging optical system are not limited to the example shown in FIG. 2.

In addition, the imaging lens 12 has a lens driving controller 34 and a memory. The lens driving controller 34 is formed of, for example, a CPU, a RAM, or a ROM. The lens driving controller 34 is electrically connected to a processor 40 in the main body 11 via the electrical contact 12B and the electrical contact 11B.

The lens driving controller 34 drives the focus lens 31 and the stop 33 based on a control signal transmitted from the processor 40. The lens driving controller 34 performs drive control of the focus lens 31 based on a control signal for focusing control transmitted from the processor 40 in order to adjust a focal position of the imaging lens 12.

The stop 33 has an opening whose opening diameter is variable about the optical axis. The lens driving controller 34 performs drive control of the stop 33 based on a control signal for stop adjustment transmitted from the processor 40 in order to adjust the amount of light incident on a light-receiving surface 20A of the imaging sensor 20.

The main body 11 is provided with the imaging sensor 20, the processor 40, an image processing unit 41, an operating part 42, a mechanical anti-shaking mechanism 43, a shake detection sensor 44, a memory 45, and the display 15. Operations of the imaging sensor 20, the image processing unit 41, the operating part 42, the mechanical anti-shaking mechanism 43, the shake detection sensor 44, the memory 45, and the display 15 are controlled by the processor 40. The processor 40 is formed of, for example, a CPU, a RAM, or a ROM. In this case, the processor 40 executes various processes based on an operation program 45A stored in the memory 45. The processor 40 may be formed of an aggregate of a plurality of IC chips.

The imaging sensor 20 is, for example, a CMOS type image sensor. The imaging sensor 20 is disposed such that the Z axis $A_Z$ as the optical axis is orthogonal to the light-receiving surface 20A and the Z axis $A_Z$ is located at the center of the light-receiving surface 20A. Light (subject image) that has passed through the imaging lens 12 is incident on the light-receiving surface 20A. A plurality of pixels, which generate an image signal by performing photoelectric conversion, are formed on the light-receiving surface 20A. The imaging sensor 20 generates and outputs an image signal by photoelectrically converting light incident on each pixel. The imaging sensor 20 is an example of an "imaging element" according to the technology of the present disclosure.

In addition, a color filter array of a Bayer array is disposed on the light-receiving surface of the imaging sensor 20, and a color filter of any one of red (R), green (G), or blue (B) is disposed to face each pixel. Therefore, each pixel of one image before color interpolation processing includes color information of any one of R, G, or B. The arrangement of the color filter array is not limited to the Bayer array, and can be changed as appropriate.

In addition, the imaging sensor 20 is held by the mechanical anti-shaking mechanism 43. The mechanical anti-shaking mechanism 43 holds the imaging sensor 20 such that the imaging sensor 20 is translatable in directions of the X axis $A_X$ and Y axis $A_Y$ and is rotatable in the roll direction. A configuration of the mechanical anti-shaking mechanism 43 is known, for example, in JP2016-171511A. The mechanical anti-shaking mechanism 43 is an example of a "moving mechanism configured to change a relative position between a subject image and an imaging element" according to the technology of the present disclosure. The mechanical anti-shaking mechanism 43 may be a mechanism that drives a part of the lenses constituting the imaging optical system of the imaging lens 12 to change the relative position between the subject image and the imaging sensor 20.

The shake detection sensor 44 detects a shake applied to the main body 11 that accommodates the imaging sensor 20 therein. The shake detection sensor 44 is, for example, a five-axis shake detection sensor that detects a shake in each of the roll direction, the yaw direction, the pitch direction, the X direction, and the Y direction. Hereinafter, the shake in the roll direction is referred to as rotational shake. The shake in the yaw direction and in the pitch direction is referred to as angular shake. The shake in the X direction and in the Y direction is referred to as translational shake.

The shake detection sensor 44 is formed of, for example, a gyro sensor and an acceleration sensor. The gyro sensor detects the rotational shake and the angular shake. The acceleration sensor detects the translational shake.

The processor 40 performs drive control of the mechanical anti-shaking mechanism 43 based on the shake of the imaging apparatus 10 (shake applied to the imaging apparatus 10) detected by the shake detection sensor 44. Specifically, the processor 40 changes the relative position between the subject image and the imaging sensor 20 such that displacement of the subject image caused by a camera shake of the user is offset.

The mechanical anti-shaking mechanism 43 may be provided with a position detection sensor for detecting a position of the imaging sensor 20. This position detection sensor is, for example, a hall sensor. In this case, the processor 40 performs drive control of the mechanical anti-shaking mechanism 43 based on shake information detected by the shake detection sensor 44 and position information of the imaging sensor 20 detected by the position detection sensor. The processor 40 may stop the drive control of the mechanical anti-shaking mechanism 43 in a case of the multi-shot combining mode described above.

In a case of the multi-shot combining mode, the processor 40 causes the imaging sensor 20 to perform a plurality of times (for example, four times) of imaging operations determined in advance in response to the operation of the release button 14 by the user. That is, in the multi-shot combining mode, the imaging sensor 20 performs an imaging process of acquiring a plurality of images with different relative positions between the subject image and the imaging sensor 20. The image acquired by the imaging sensor 20 is an example of a "first image" according to the technology of the present disclosure.

The image processing unit 41 is formed of, for example, a DSP. The image processing unit 41 generates image data in a predetermined file format (for example, JPEG format)

by performing various kinds of image processing, such as color interpolation processing, on the image signal.

In addition, in the multi-shot combining mode, the image processing unit 41 performs a combining process of generating a super-resolution image by combining the plurality of images acquired by the imaging process. The super-resolution image is an example of a "second image" according to the technology of the present disclosure.

Specifically, the image processing unit 41 derives a shift amount for each region of each image based on the shake information detected by the shake detection sensor 44 and the position information of the imaging sensor 20 detected by the position detection sensor, and combines the plurality of images based on the derived shift amount. The image processing unit 41 can also calculate the shift amount for each region of each image by using a block matching technology instead of the shake information and the position information. The combining process used in the multi-shot combining mode is known, for example, in JP2019-161564A.

The display 15 displays an image based on the image data generated by the image processing unit 41. The image includes a still image, a video image, and a live view image. The live view image is an image that is displayed in real time on the display 15 by sequentially outputting the image data generated by the image processing unit 41, to the display 15.

The image data generated by the image processing unit 41 can be stored in an internal memory (not shown) built in the main body 11 or a storage medium (for example, a memory card) that can be attached to and detached from the main body 11.

The operating part 42 includes the above-described dial 13 and release button 14, and an instruction key (not shown). The instruction key is provided on the back surface side of the main body 11, for example. The processor 40 controls each unit in the main body 11 and the lens driving controller 34 in the imaging lens 12 in response to an operation of the operating part 42.

In the multi-shot combining mode, the processor 40 performs a determination process of determining whether or not the combining process by the image processing unit 41 is executable based on whether or not at least one of the plurality of images acquired by the imaging process satisfies a predetermined quality condition. The quality condition is a condition determined based on a brightness, a shake, or a degree of blurriness of the image. The quality condition may be a condition based on a brightness, a shake, or a degree of blurriness of one image, or may be a condition based on a difference in a brightness, a shake, or a degree of blurriness, or a difference in a subject position between a plurality of images. In addition, the quality condition may be a comprehensive condition using a plurality of indicators such as a brightness, a shake, and a degree of blurriness. Further, the quality condition may be a different condition for each of the plurality of images acquired by the imaging process. Here, the quality condition is an example of a "first condition" according to the technology of the present disclosure.

In a case in which a negative determination is made in the determination process, the processor 40 changes the process content in the imaging process. In the present embodiment, a first stopping process of stopping the capturing of the subject image by the imaging sensor 20 is performed. Examples of the changed process content of the imaging apparatus include a mode in which the imaging process is stopped, a mode in which a part of the imaging process is re-executed, and a mode in which an imaging condition setting (a shutter speed, a stop amount of the imaging lens, sensitivity of the imaging element, sensitivity of the moving mechanism, and the like) is changed.

In addition, in the multi-shot combining mode, the processor 40 performs a display process of performing a temporal display relating to the imaging process or the combining process. The processor 40 controls the display 15 to perform a temporal display relating to the imaging process or the combining process on the display 15. More preferably, the temporal display is a display with which an execution time of the imaging process or the combining process is recognizable by the user. The temporal display is, for example, a remaining time display representing a time until an end of the imaging process and the combining process. In the temporal display, a remaining time of the imaging process and a remaining time of the combining process may be individually displayed, or a remaining time until an end of a super-resolution process in which the imaging process and the combining process are combined may be displayed. In addition, the temporal display is not limited to a display aspect in which the remaining time is directly displayed, and may be a display aspect in which the number of remaining images or the like is displayed.

In addition, in the multi-shot combining mode, in a case in which a negative determination is made in the determination process, the processor 40 performs a second stopping process of stopping the temporal display relating to the imaging process or the combining process in addition to the first stopping process of stopping the capturing of the subject image by the imaging sensor 20.

In addition, in a case in which a negative determination is made in the determination process, the processor 40 performs a notification process of notifying the user of a reason for stopping the capturing of the subject image or a reason for stopping the temporal display. For example, the processor 40 controls the display 15 to display the stopping reason on the display 15, thereby notifying the user of the stopping reason.

Figure 3:
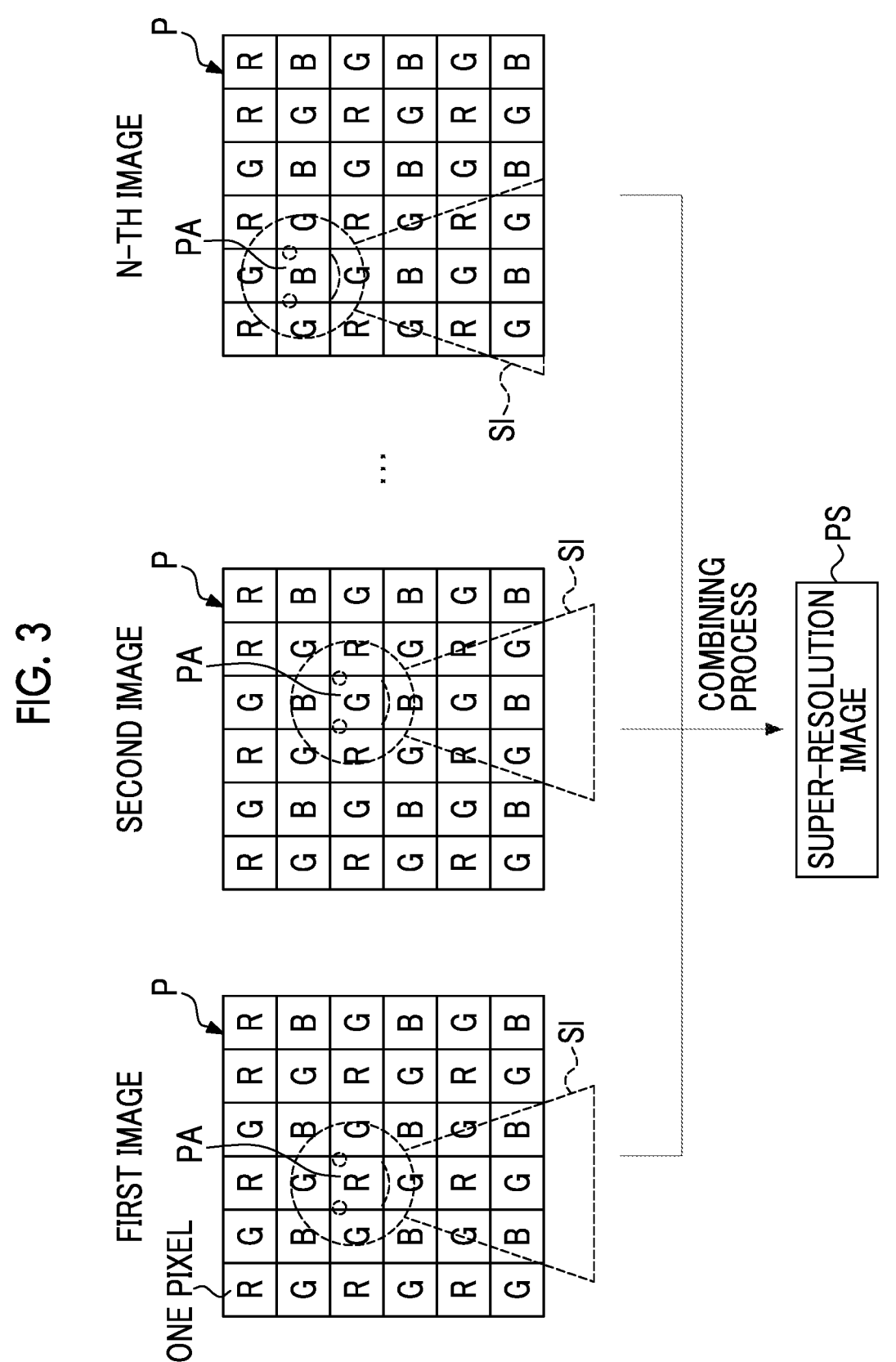
FIG. 3 is a diagram showing an example of an imaging process and a combining process in a multi-shot combining mode.

FIG. 3 shows an example of the imaging process and the combining process in the multi-shot combining mode. As shown in FIG. 3, N images P are acquired by the imaging sensor 20 in the imaging process. During the imaging process, a shake is applied to the imaging apparatus 10 due to a camera shake of the user or the like, and thus a position of a subject image SI reflected in each image P is shifted.

Since the position of the subject image SI is shifted in each image P, a plurality of color information are included in each region constituting the subject image SI. In the example shown in FIG. 3, a region PA in the subject image SI includes color information on all colors R, G, and B. In this way, since a plurality of color information are included in each region constituting the subject image SI, a super-resolution image PS with a high quality can be obtained by combining the N images P.

The super-resolution image PS is stored in the memory 45, and then displayed on the display 15 under the control of the processor 40.

Figures 4, 5:
FIG. 4 is a diagram showing an example of a temporal display performed in the multi-shot combining mode.
FIG. 5 is a diagram showing an example of notification performed in the multi-shot combining mode.

FIG. 4 shows an example of the temporal display performed in the multi-shot combining mode. In the example shown in FIG. 4, for each of the imaging process and the combining process, a ratio of an elapsed process time to a total time required for the process is displayed on the display 15 (that is, displayed as a percentage). In addition to the percentage display, a remaining time of each process may be displayed.

FIG. 5 shows an example of notification performed in the multi-shot combining mode. In the example shown in FIG. 5, in a case in which the imaging is stopped during the imaging process, the processor 40 displays the fact that the imaging process has been stopped and a reason for stopping the imaging, on the display 15. The stopping reason is, for example, a change in a brightness during the imaging process. For example, in a case in which a change in a brightness of the subject image occurs due to a change in illumination caused by a flicker of a fluorescent lamp or the like, a difference in a brightness occurs between a plurality of images to be combined, and the combining process may not be performed. Other causes for stopping the imaging process or the combining process include a case in which an unacceptable large shake is applied to the imaging apparatus 10, and a case in which the subject is moved significantly.

Figure 6:
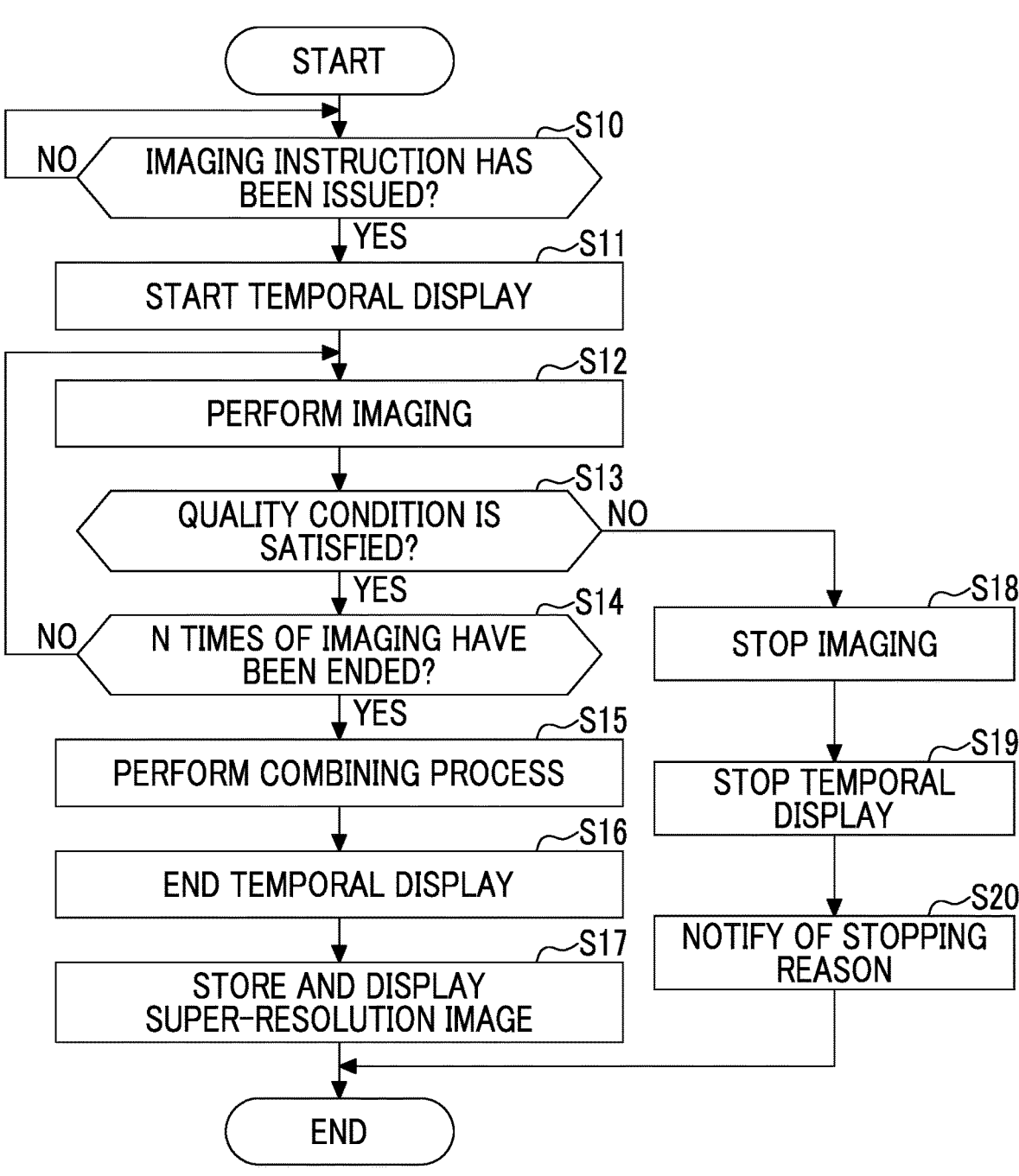
FIG. 6 is a flowchart showing an example of a series of operations in the multi-shot combining mode.

FIG. 6 is a flowchart showing an example of a series of operations in the multi-shot combining mode. As shown in FIG. 6, the processor 40 determines whether or not an imaging instruction has been issued by the user operating the release button 14 (step S10). In a case in which it is determined that the imaging instruction has been issued (step S10: YES), the processor 40 starts the above-described temporal display (step S11) and causes the imaging sensor 20 to capture a subject image (step S12).

The processor 40 determines whether or not the image acquired by the imaging sensor 20 satisfies the above-described quality condition (step S13). In a case in which the quality condition is satisfied (step S13: YES), the processor 40 determines whether or not the imaging sensor 20 has ended a plurality of times (here, N times) of imaging determined in advance (step S14). In a case in which N times of imaging have not been ended (step S14: NO), the processor 40 returns the process to step S12 and causes the imaging sensor 20 to perform the capturing of the subject image again.

In a case in which N times of imaging have been ended (step S14: YES), the processor 40 causes the image processing unit 41 to perform the above-described combining process (step S15), and, in a case in which the combining process by the image processing unit 41 is ended, the processor 40 ends the temporal display (step S16). Then, the processor 40 stores the super-resolution image generated by the image processing unit 41 in the memory 45 and displays the super-resolution image on the display 15 (step S17).

In a case in which it is determined in step S13 that the quality condition is not satisfied (step S13: NO), the processor 40 stops the capturing of the subject image by the imaging sensor 20 (step S18). In addition, the processor 40 stops the capturing of the subject image, and stops the temporal display (step S19). Then, the processor 40 notifies the user of the stopping reason by displaying the stopping reason on the display 15 (step S20).

Step S12 is an example of an "imaging step" according to the technology of the present disclosure. Step S15 is an example of a "combining step" according to the technology of the present disclosure. Step S11 is an example of a "display step" according to the technology of the present disclosure. Step S14 is an example of a "changing step" according to the technology of the present disclosure. Step S13 is an example of a "determination step" according to the technology of the present disclosure. Step S18 is an example of a "first stopping step" according to the technology of the present disclosure. Step S19 is an example of a "second stopping step" according to the technology of the present disclosure. Step S20 is an example of a "notification step" according to the technology of the present disclosure.

As described above, the imaging apparatus 10 of the present embodiment performs the temporal display during the execution of the super-resolution process in the multi-shot combining mode. Since the super-resolution process includes the imaging process and the combining process, the process takes a long time, so that the user may have doubts as to whether or not the process is normally proceeding. The imaging apparatus 10 of the present embodiment enables the user to recognize the processing status by performing the temporal display, thereby resolving the doubts of the user.

MODIFICATION EXAMPLE

Hereinafter, various modification examples of the above embodiment will be described.

In the embodiment, the multi-shot combining mode is a mode (hereinafter, referred to as a "multi-shot combining mode using a camera shake") in which a changing process of changing the relative position between the subject image and the imaging sensor 20 by using a shake applied to the imaging apparatus 10 due to a camera shake of the user or the like is performed. Alternatively, the multi-shot combining mode may be a mode (hereinafter, referred to as a "pixel shift multi-shot combining mode") in which a changing process of changing the relative position between the subject image and the imaging sensor 20 a plurality of times by actively moving the imaging sensor 20 by the mechanical anti-shaking mechanism 43 is performed.

In the pixel shift multi-shot combining mode, the processor 40 causes the imaging sensor 20 to perform imaging a plurality of times while finely moving the imaging sensor 20 in a direction orthogonal to the optical axis. The image processing unit 41 generates a super-resolution image by combining a plurality of images acquired by the imaging sensor 20. The pixel shift multi-shot combining mode is known in JP2016-171511A, JP2019-161564A, and the like.

In the pixel shift multi-shot combining mode, it is preferable that the imaging apparatus 10 is used in a state of being fixed on a tripod or the like because it is not preferable that a shake is applied to the imaging apparatus 10 due to a camera shake of the user or the like.

Figure 7:
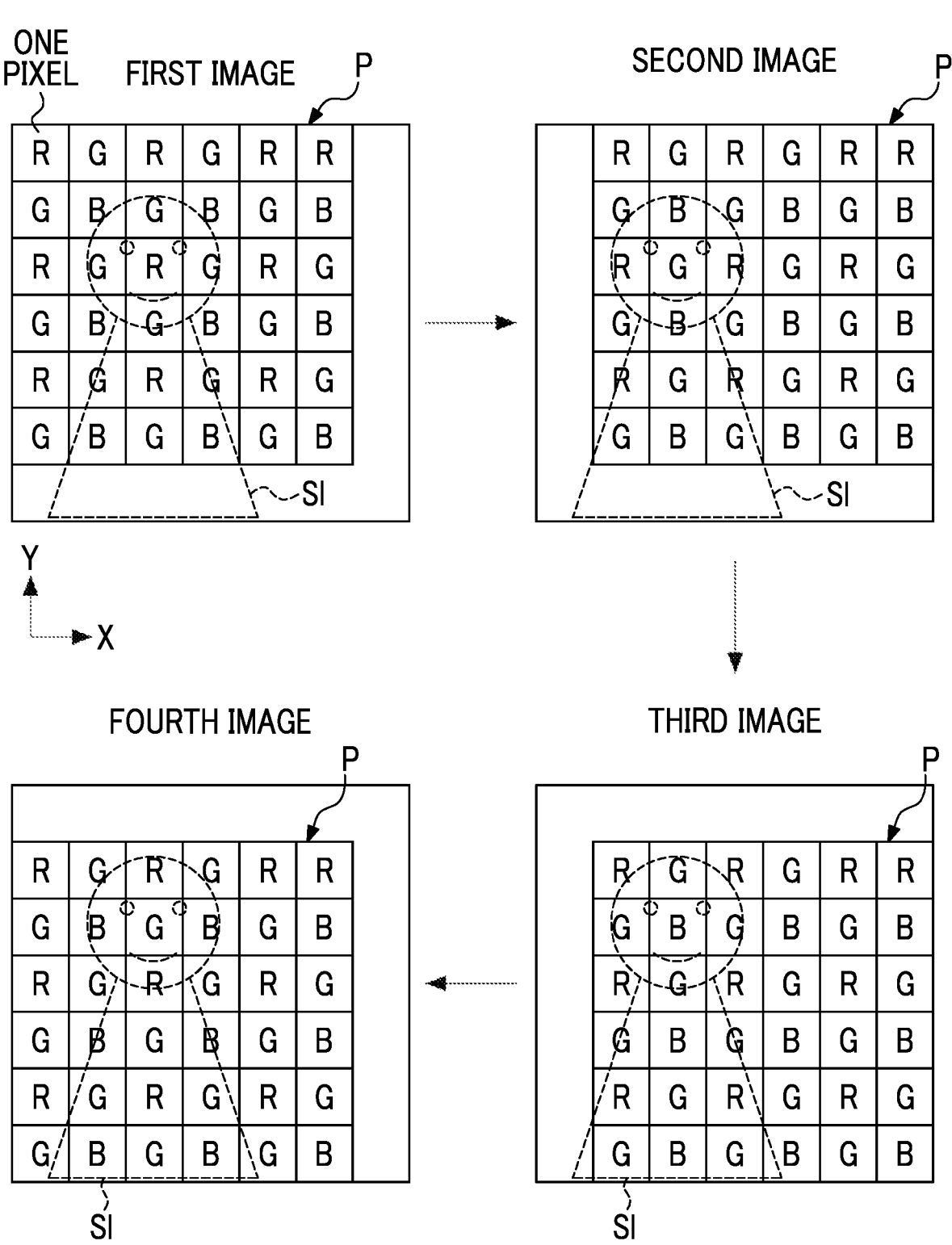
FIG. 7 is a diagram showing an example of an imaging process in a pixel shift multi-shot combining mode.

FIG. 7 shows an example of the imaging process in the pixel shift multi-shot combining mode. The example shown in FIG. 7 is an example in which a total of four images P are acquired while shifting the imaging sensor 20 by one pixel in the X direction or in the Y direction. In the pixel shift multi-shot combining mode, since color information on all colors R, G, and B are included in each region constituting the subject image SI, a super-resolution image PS with a high quality is obtained by combining the four images P. The number of the images to be acquired is not limited to four, and can be appropriately changed to, for example, nine.

Figure 8:
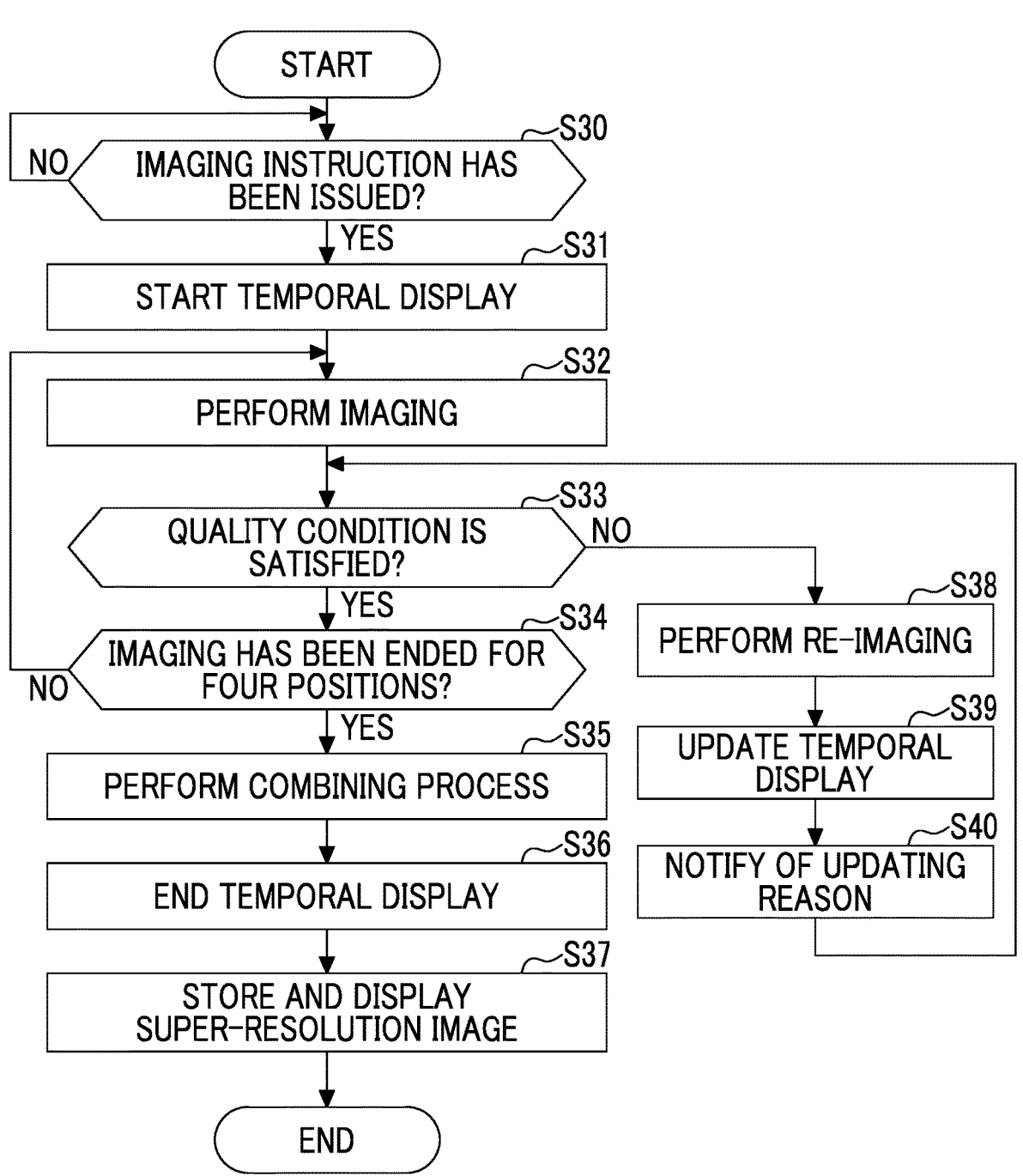
FIG. 8 is a flowchart showing an example of a series of operations in the pixel shift multi-shot combining mode.

FIG. 8 is a flowchart showing an example of a series of operations in the pixel shift multi-shot combining mode. Steps S30 to S37 shown in FIG. 8 are the same as steps S10 to S17 shown in FIG. 6. Note that, in the present modification example, the processor 40 moves the imaging sensor 20 by one pixel as shown in FIG. 7, each time the imaging sensor 20 performs the imaging in step S32. In addition, in step S34, the processor 40 determines whether or not the imaging has been ended for four positions shown in FIG. 7.

In the present modification example, in a case in which it is determined in step S33 that the quality condition is not satisfied (step S33: NO), the processor 40 causes the imaging sensor 20 to perform the imaging again at the same position (step S38). With this re-imaging, the number of imaging operations is larger than the originally planned number of imaging operations (four times), and the time required for the imaging process is longer, so that the temporal display for the imaging process is updated (step S39). Then, the processor 40 notifies the user of the reason for updating the temporal display by displaying the updating reason on the display 15 (step S40). After that, the processor 40 returns the process to step S33 and determines whether or not the image acquired by the re-imaging satisfies the quality condition. Step S39 is an example of an "update step" according to the technology of the present disclosure.

As described above, in the pixel shift multi-shot combining mode according to the present modification example, the relative position between the subject image and the imaging sensor 20 is changed by moving the imaging sensor 20 to a predetermined position using the mechanical anti-shaking mechanism 43. In a case in which a negative determination is made in the determination process, the processor 40 increases the number of capturing operations of the subject image in the imaging process more than in a case in which an affirmative determination is made. In a case in which the number of the capturing operations of the subject image is increased, the processor 40 updates the temporal display in the display process. The notification process of notifying the user of the reason for increasing the number of the capturing operations in the imaging process or the reason for updating the temporal display is performed.

Figure 9:
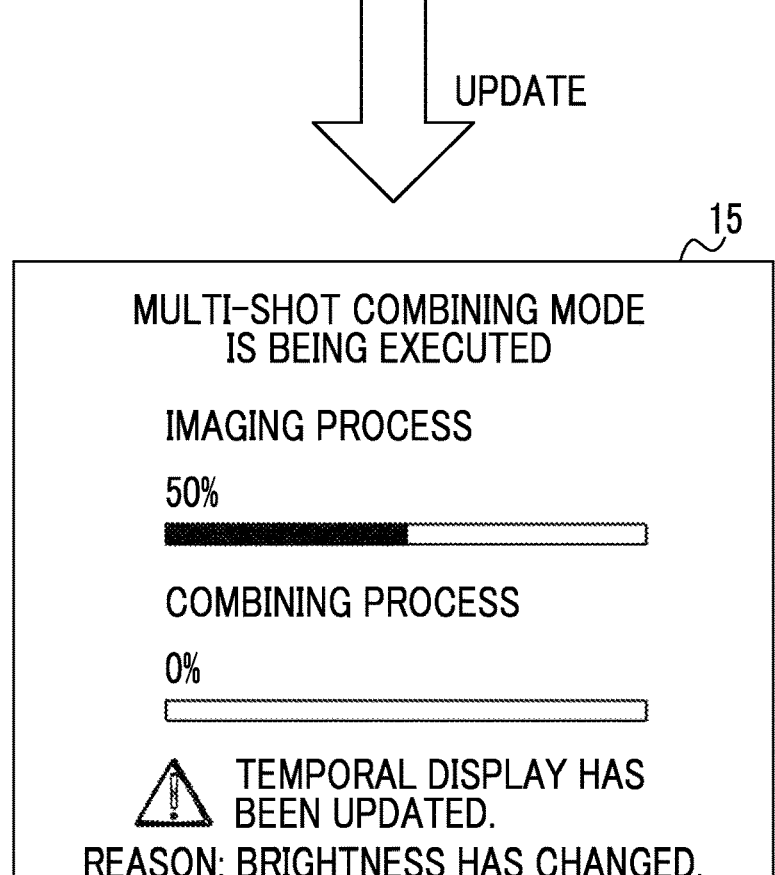
FIG. 9 is a diagram showing an example of updating a temporal display in a case in which the number of capturing operations of a subject image is increased.

FIG. 9 shows an example of updating the temporal display in a case in which the number of the capturing operations of the subject image is increased. In a case in which the number of the capturing operations is increased due to the re-imaging, the remaining time of the imaging process is longer. Therefore, as shown in FIG. 9, the processor 40 changes the percentage display so that the user can recognize that the remaining time has been longer. In the example shown in FIG. 9, the processor 40 displays, on the display 15, that a brightness has changed as the reason for updating the temporal display.

In the example shown in FIG. 9, in a case in which it is determined in step S33 that the quality condition is not satisfied, the processor 40 causes the imaging sensor 20 to perform the re-imaging, but may not cause the imaging sensor 20 to perform the re-imaging. In this case, the processor 40 need only cause the image processing unit 41 to perform the combining process by using only the image satisfying the quality condition.

In addition, the multi-shot combining mode using a camera shake (hereinafter, referred to as a first mode) and the pixel shift multi-shot combining mode (hereinafter, referred to as a second mode) may be selectable by the user by using the operating part 42. That is, the first mode and the second mode may be selectively executable by the processor 40. In this case, in a case in which a negative determination is made in the determination process, the processor 40 changes the temporal display in the display process to different contents between the first mode and the second mode. For example, the processor 40 stops the temporal display in the first mode, and updates the temporal display in the second mode.

In the embodiment and the modification examples, it is determined whether or not the image obtained by the imaging satisfies the quality condition each time the imaging sensor 20 captures the subject image. Alternatively, the imaging sensor 20 may perform imaging a plurality of times to acquire a predetermined number of images, and then determine whether or not each image satisfies the quality condition.

In addition, in the embodiment and the modification examples, the processor 40 performs the temporal display and the display of the reason on the display 15, but, instead of or in addition to the display 15, the processor 40 may display the temporal display and the display of the reason on the finder 17.

Figure 10:
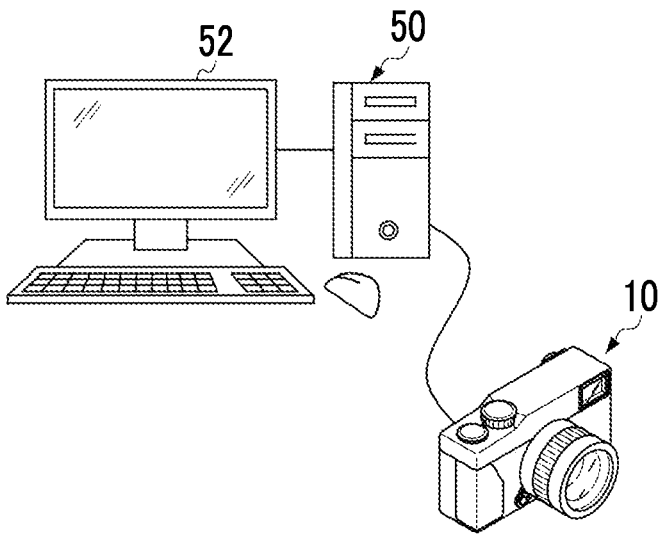
FIG. 10 is a diagram showing an example in which the imaging apparatus is connected to an external apparatus.

In addition, as shown in FIG. 10, the imaging apparatus 10 may be able to perform tethered imaging in which imaging is performed in a wired or wirelessly connected state to a personal computer 50. In this case, the combining process described above may be performed in the personal computer 50. In addition, the temporal display and display of the reason described above may be performed on a display 52 provided in the personal computer 50. The imaging apparatus 10 may be connectable to an external apparatus other than the personal computer 50.

In the embodiment, various processors shown below can be used as a hardware structure of a control unit using the processor 40 as an example. The various processors include, in addition to the CPU that is a general-purpose processor that functions by executing software (program), a PLD that is a processor of which the circuit configuration can be changed after manufacture, such as an FPGA. In addition, the various processors include a dedicated electric circuit that is a processor having a circuit configuration designed to be dedicated to execute specific processing, such as an ASIC.

The control unit may be configured of one of the various processors, or may be configured of a combination of the same or different kinds of two or more processors (for example, a combination of a plurality of FPGAs or a combination of the CPU and the FPGA). In addition, a plurality of control units may be configured of one processor.

A plurality of examples in which a plurality of control units are configured as one processor can be considered. In the first example, there is a form in which, as typified by computers such as a client and a server, one processor is configured by combining one or more CPUs and software, and the processor functions as a plurality of control units. In the second example, there is a form in which, as typified by a system on chip (SoC) and the like, in which a processor that implements functions of an entire system including a plurality of control units with one IC chip is used. As described above, the control unit can be configured using one or more of the various processors as a hardware structure.

Further, as the hardware structure of these various processors, more specifically, it is possible to use an electric circuit in which circuit elements such as semiconductor elements are combined.

The content of the above description and the content of the drawings are detailed explanations of the parts relating to the technology of the present disclosure, and are merely examples of the technology of the present disclosure. For example, description related to the above configurations, functions, actions, and effects is description related to an example of configurations, functions, actions, and effects of the parts relating to the technology of the present disclosure. Thus, it is needless to say that unnecessary portions may be deleted, new elements may be added, or replacement may be made to the content of the above description and the content of the drawings without departing from the gist of the technology of the present disclosure. In order to avoid complication and easily understand the parts relating to the technology of the present disclosure, in the content of the above description and the content of the drawings, the description regarding common general technical knowledge which is not necessarily particularly described in terms of embodying the technology of the present disclosure is omitted.

All documents, patent applications, and technical standards mentioned in the present specification are incorporated herein by reference to the same extent as in a case in which each document, each patent application, and each technical standard are specifically and individually described by being incorporated by reference.

What is claimed is:

1. An imaging method used in an imaging apparatus including an imaging sensor that captures a subject image and a moving mechanism configured to change a relative position between the subject image and the imaging sensor, the imaging method comprising:
   a changing step of changing the relative position a plurality of times;
   an imaging step of acquiring a plurality of first images by capturing the subject image using the imaging sensor at a plurality of the relative positions;
   a combining step of generating a second image by combining the plurality of first images;
   a determination step of determining whether or not the combining step is executable based on whether or not at least one of the plurality of first images satisfies a first condition,
      wherein the combining step is executed in a case in which an affirmative determination is made in the determination step, and
      wherein a process content of the imaging step is changed in a case in which a negative determination is made; and
   a display step of performing a temporal display relating to the imaging step or the combining step.

2. The imaging method according to claim 1,
   wherein the temporal display is a display with which an execution time of the imaging step or the combining step is recognizable.

3. The imaging method according to claim 1, further comprising:
   a first stopping step of stopping the capturing of the subject image in the imaging step in a case in which a negative determination is made in the determination step.

4. The imaging method according to claim 3, further comprising:
   a second stopping step of stopping the temporal display in the display step in a case in which the capturing of the subject image is stopped.

5. The imaging method according to claim 4, further comprising:
   a notification step of notifying a user of a reason for stopping the capturing of the subject image or a reason for stopping the temporal display.

6. The imaging method according to claim 1,
   wherein, in the changing step, the relative position is changed by using a shake applied to the imaging apparatus.

7. The imaging method according to claim 1,
   wherein, in a case in which a negative determination is made in the determination step, the number of capturing operations of the subject image in the imaging step is increased more than in a case in which an affirmative determination is made.

8. The imaging method according to claim 7, further comprising:
   an update step of updating the temporal display in the display step in a case in which the number of the capturing operations of the subject image in the imaging step is increased.

9. The imaging method according to claim 8, further comprising:
   a notification step of notifying a user of a reason for increasing the number of the capturing operations in the imaging step or a reason for updating the temporal display.

10. The imaging method according to claim 7,
   wherein, in the changing step, the relative position is changed by moving the imaging sensor to a predetermined position using the moving mechanism.

11. An imaging apparatus comprising:
   an imaging sensor that captures a subject image;
   a moving mechanism configured to change a relative position between the subject image and the imaging sensor; and
   a processor,
   wherein the processor is configured to execute
   a changing process of changing the relative position a plurality of times,
   an imaging process of acquiring a plurality of first images by capturing the subject image using the imaging sensor at a plurality of the relative positions,
   a combining process of generating a second image by combining the plurality of first images,
   a determination process of determining whether or not the combining process is executable based on whether or not at least one of the plurality of first images satisfies a first condition,
      wherein the combining process is executed in a case in which an affirmative determination is made in the determination process, and
      wherein a process content of the imaging process is changed in a case in which a negative determination is made; and
   a display process of performing a temporal display relating to the imaging process or the combining process.

12. The imaging apparatus according to claim 11,
   wherein the processor is configured to
   selectively execute a first mode and a second mode,
   in the first mode, change the relative position by using a shake applied to the imaging apparatus in the changing process,
   in the second mode, change the relative position by moving the imaging sensor to a predetermined position using the moving mechanism in the changing process,
   change the temporal display in the display process to different contents between the first mode and the second mode in a case in which a negative determination is made in the determination process.

* * * * *